United States Patent [19]
Genovese et al.

[11] Patent Number: 5,835,121
[45] Date of Patent: Nov. 10, 1998

[54] PIXEL EXPOSURE CONTROL FOR A RASTER OUTPUT SCANNER IN AN ELECTROPHOTOGRAPHIC PRINTER

[75] Inventors: Frank C. Genovese, Fairport; James W. Lannom, Webster, both of N.Y.

[73] Assignee: Xerox Corporation, Stamford, Conn.

[21] Appl. No.: 426,203

[22] Filed: Apr. 21, 1995

[51] Int. Cl.$^6$ .................................................. B41J 2/47
[52] U.S. Cl. ........................................ 347/246; 347/247
[58] Field of Search ................................ 347/246, 225, 347/247, 236, 237; 250/206, 214, 215; 327/94, 82, 78, 72

[56] References Cited

U.S. PATENT DOCUMENTS

| | | | |
|---|---|---|---|
| 4,265,532 | 5/1981 | McIntosh | 355/20 |
| 4,685,097 | 8/1987 | van der Put | 369/54 |
| 4,831,410 | 5/1989 | Adams et al. | 355/208 |
| 4,868,675 | 9/1989 | Joosten et al. | 358/296 |
| 4,977,414 | 12/1990 | Shimada et al. | 347/247 |
| 4,998,118 | 3/1991 | Ng | 347/236 |
| 5,043,745 | 8/1991 | Inoue et al. | 347/246 |
| 5,061,949 | 10/1991 | Ogino et al. | 347/133 |
| 5,164,745 | 11/1992 | Matsuoka | 347/246 |
| 5,325,383 | 6/1994 | Davis et al. | 372/26 |
| 5,497,181 | 3/1996 | Paoli | 347/133 |

FOREIGN PATENT DOCUMENTS

| | | | |
|---|---|---|---|
| 355839 | 2/1990 | European Pat. Off. . | |
| 403196A2 | 12/1990 | European Pat. Off. | 327/94 |
| 32671 | 1/1991 | Japan | 327/78 |
| 395799 | 4/1991 | Japan | 327/94 |

*Primary Examiner*—Benjamin R. Fuller
*Assistant Examiner*—Charlene Dickens
*Attorney, Agent, or Firm*—R. Hutter

[57] ABSTRACT

In a raster output scanning apparatus including a laser diode adapted to output a writing beam, a reflex circuit controls the laser diode. A sensor diode is positioned to receive a portion of light flux from the laser diode while the laser diode emits the writing beam to expose one pixel area on a photosensitive surface. An accumulator associated with the sensor diode accumulates charge created by the sensor diode resulting from light flux from the laser diode. A comparator associated with the accumulator monitors charge accumulated on the accumulator and arrests the source of light flux when the charge accumulated on the accumulator reaches a predetermined threshold level.

9 Claims, 5 Drawing Sheets

PIXEL EXPOSURE CONTROL FOR A RASTER OUTPUT SCANNER IN AN ELECTROPHOTOGRAPHIC PRINTER

The present invention relates to laser exposure control for use in a raster output scanner (ROS) for creating electrostatic latent images from electronic data.

Electrophotographic "laser" printers, wherein a laser scan line is projected onto a photoconductive surface to create an image to be printed, are well known. In the case of printers, facsimile machines, and the like, it is common to employ a raster output scanner (ROS) as a source of optical patterns to be imaged on photographic film or an electrostatically charged photoreceptor (a photosensitive plate, belt, or drum) for purposes of printing. The ROS provides a laser beam which switches on and off according to electronic image data associated with the desired image to be printed, exposing the charged photoreceptor point by point as the beam moves, or scans, across its surface. Commonly, the surface of the photoreceptor is selectively imagewise discharged by the laser beam in locations to be printed white, to form the desired image on the photoreceptor. Modulation of the scanned beam creating the desired latent image on the photoreceptor is typically implemented by digital circuitry designed to control the level of operating current that defines the light flux output of a high speed laser diode. A common technique for deflecting the modulated laser beam to form a scan line across the photoreceptor surface uses a motor driven rotating optical polygon with multiple reflecting surfaces; the laser beam from the collimated laser diode source is reflected by the facets of the polygon, creating a scanning motion of the beam, which is optically imaged to form a sharply focused scan line across the photoreceptor surface. A closely spaced regular array of scan lines on a photoreceptor collectively form a raster of the desired latent image. Once a latent image is formed on the photoreceptor, the latent image is subsequently developed with toner, and the developed image is transferred to a copy sheet, as in the well-known process of electrophotography.

In a practical ROS system, an important parameter is the operating intensity of the laser writing beam which discharges the selected areas on the photoreceptor. As is well-known in the art of laser diodes, a typical laser diode has associated therewith a lasing "threshold current" of a predetermined magnitude, which, when applied to the laser diode, causes the laser diode to emit a coherent laser beam. Below this lasing excitation threshold, the laser diode emits light flux, but the light emitted is incoherent. Above the lasing threshold, there is an approximately linear response between applied current and the intensity of light flux emitted by the laser diode.

The threshold current defining the onset of the coherent lasing condition in a particular laser diode, along with the overall response of the laser diode optical output power as a function of operating current can change profoundly as a function of the junction temperature of the diode. At elevated temperatures, the junction forward voltage drop decreases, the lasing current threshold increases, and the conversion efficiency for converting electrical input power to light flux decreases. Above the lasing threshold, the slope of the light flux in response to changes in drive current can vary with temperature. Of course, an important source of heat in any laser system is the drive current flowing through the diode junction itself; for this reason, the instantaneous characteristics of a laser diode change dynamically, responding to the power dissipated in the junction in the course of use. To minimize or compensate for these temperature-related variations in performance, various schemes have been proposed to regulate the temperature of the laser diode or sense and compensate for temperature-induced changes in mean light flux output. Further, like most semiconductor devices mass produced in batch quantities, slight but significant variations between individual devices of a given design are inevitable. In order to provide a robust system that can provide precise exposure levels in adverse environmental conditions over long periods of time, a successful ROS design must take into account these performance variables.

U.S. Pat. No. 4,265,532 discloses an exposure control device for use in a cathode ray tube, in which a photodetector views the scanning beam passing through different incremental areas of a transparency being reproduced.

U.S. Pat. No. 4,685,097 discloses an exposure control system for a laser printer, in which a light sensing diode is used to determine laser output power, which is then used to adjust the read and write current supplied to the laser by a control circuit.

U.S. Pat. No. 4,831,410 discloses a flash exposure photocopier including a photosensor located within a flash housing which exposes the original document. The output of the photosensor is integrated and applied to a comparator. The comparator output controls the duration of the flash source to quench lamp operation when an input level corresponding to set reference level is reached. It should be noted that this feedback system relies on the reflection from an actual hard-copy document, as opposed to the direct output of the lamp which illuminates the document.

U.S. Pat. No. 4,868,675 discloses a control circuit for a laser printer which utilizes a laser switching amplifier for supplying current to a laser diode. The control circuit has a correction circuit which compensates for the turn-on delay time of the laser diode. The correction circuit lengthens the incoming image signal which controls the laser diode output by adjusting the duty cycle or operating time.

U.S. Pat. No. 4,977,414 discloses a laser printer in which the laser diode is controlled on the basis of image data and selectable sets of control data stored in memory. The sets of control data are provided to compensate for the predetermined optical characteristics of the optical scanning system.

U.S. Pat. No. 4,998,118 discloses an LED printer, wherein a sensor is provided at the focal plane of a lens used to focus light from the LED junctions onto a film surface.

U.S. Pat. No. 5,043,745 discloses a light-intensity control apparatus. A beam for recording an image is monitored by a detection unit, and the detected output level of the beam is sent to a control unit. The control unit causes the detection unit to sample the light intensity of the beam during an image recording period. The light intensity of the beam is then adjusted during a non-image recording period on the basis of the light intensity monitored during the image recording period.

U.S. Pat. No. 5,061,949 discloses, in FIG. 4 thereof, a triggering and feedback system for a laser diode in a laser printer. As can be seen, a bias current is applied to the laser diode at a point downstream of a switch SW3 which is used to selectably excite the laser diode. Further downstream of the switch SW3 is a feedback system by which light detected from the laser diode is adjusted in intensity.

U.S. Pat. No. 5,164,745 discloses a laser printer wherein a laser beam is detected by a photosensor, presetting a flip-flop. A timer is driven in accordance with a preset output from the flip-flop, causing the laser to emit a laser beam. Another timer is driven in response to a front edge of the preset output of the flip-flop to generate a horizontal synchronizing signal.

U.S. Pat. No. 5,325,383 discloses a laser imaging apparatus including a laser diode, the power of which varies as a function of a digital image input signal. The laser diode can be selectably controlled to operate in an amplitude modulation mode, or a pulse amplitude modulation mode.

It is known in the art of flash photographic cameras to provide a system wherein a photodetector integrated in the camera monitors light actually reflected from the subject to the imaging lens and terminates the flash when a threshold quantity of light is accumulated by the photodetector.

According to the present invention, there is provided, in a raster output scanning apparatus for directing a modulated writing beam to a photosensitive surface to selectably expose a plurality of pixel areas thereon, an apparatus to control the laser diode adapted to output the writing beam. A sensor diode is positioned to receive a portion of light flux directly from the laser diode while the laser diode emits the writing beam to expose one pixel area on the photosensitive surface. An accumulator is associated with the sensor diode, and accumulates charge created by the sensor diode resulting from light flux from the laser diode. A comparator, associated with the accumulator, monitors charge accumulated on the accumulator and output a quench signal when the charge accumulated on the accumulator exceeds a predetermined threshold level. The quench signal operates to turn off the laser diode.

Figure 1:
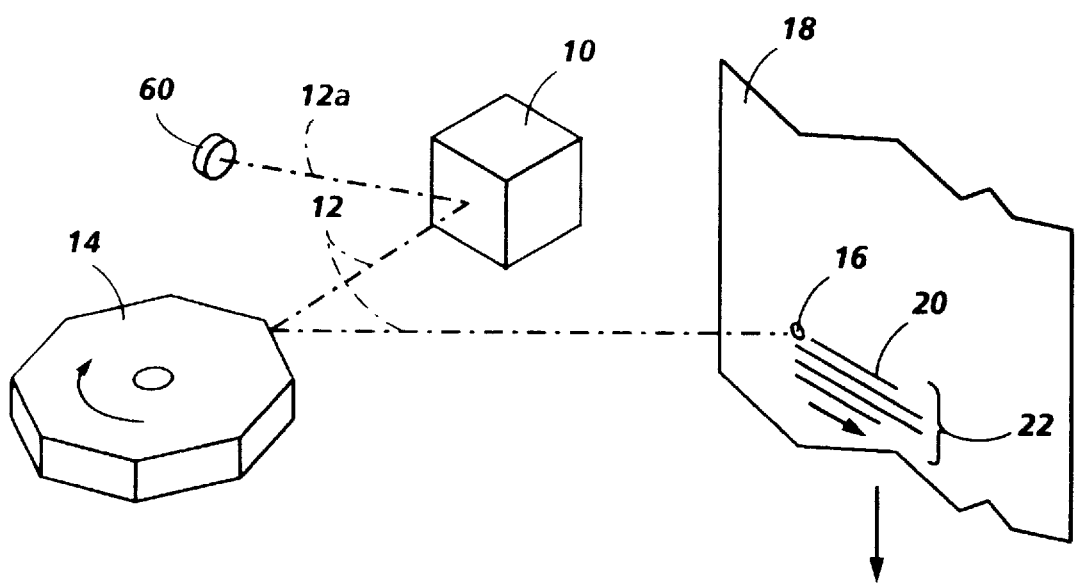
FIG. 1 is a perspective view showing the basic elements of a raster-output scanner (ROS)

FIG. 1 shows the basic configuration of a scanning system used, for example, in an electrophotographic printer or facsimile machine. A laser source 10 produces a collimated laser beam, also referred to as a "writing beam," 12 which is reflected by the facets of a rotating polygon 14. Each facet of the polygon 14 in turn deflects the writing beam 12 to create an illuminated spot 16 on the pre-charged surface of photoreceptor 18, which in this case is a moving belt. Laser source 10 also includes means for modulating the beam 12 according to image data entered therein. The localized light flux in spot 16 incident at a particular location on the surface of photoreceptor 18, corresponding to a picture element (pixel) in a "pixel area" of the desired image, discharges the surface for pixels of the desired image which are to be printed white in a charged-area development system (or, alternately, areas which are to be printed black in a discharged-area development system). In locations having pixels which are to be printed black, writing beam 12 is momentarily interrupted through the action of the modulator within source 10, so that the pixel at that location on the surface of photoreceptor 18 will not be discharged. It is to be understood that gray levels are typically imaged in like manner by utilizing exposure levels intermediate between the "on" and "off" levels. Thus, digital data input into laser source 10 is rendered line by line as an electrostatic latent image on the surface of photoreceptor 18.

The rotational motion of polygon 14 results in a spot 16 moving across the surface of photoreceptor 18 to form a scan line 20 of selectively discharged areas on photoreceptor 18. At the same time, the surface of photoreceptor 18 is slowly translated at a constant velocity so that the periodic scanning of spot 16 across the moving photoreceptor 18 creates an evenly spaced closely spaced array of scan lines 20, called a raster 22, on the surface of photoreceptor 18, forming the desired continuous image to be printed. One skilled in the art will appreciate that such a configuration has traditionally further included any number of lenses, mirrors and translational mechanisms to accommodate a specific design.

Figure 2:
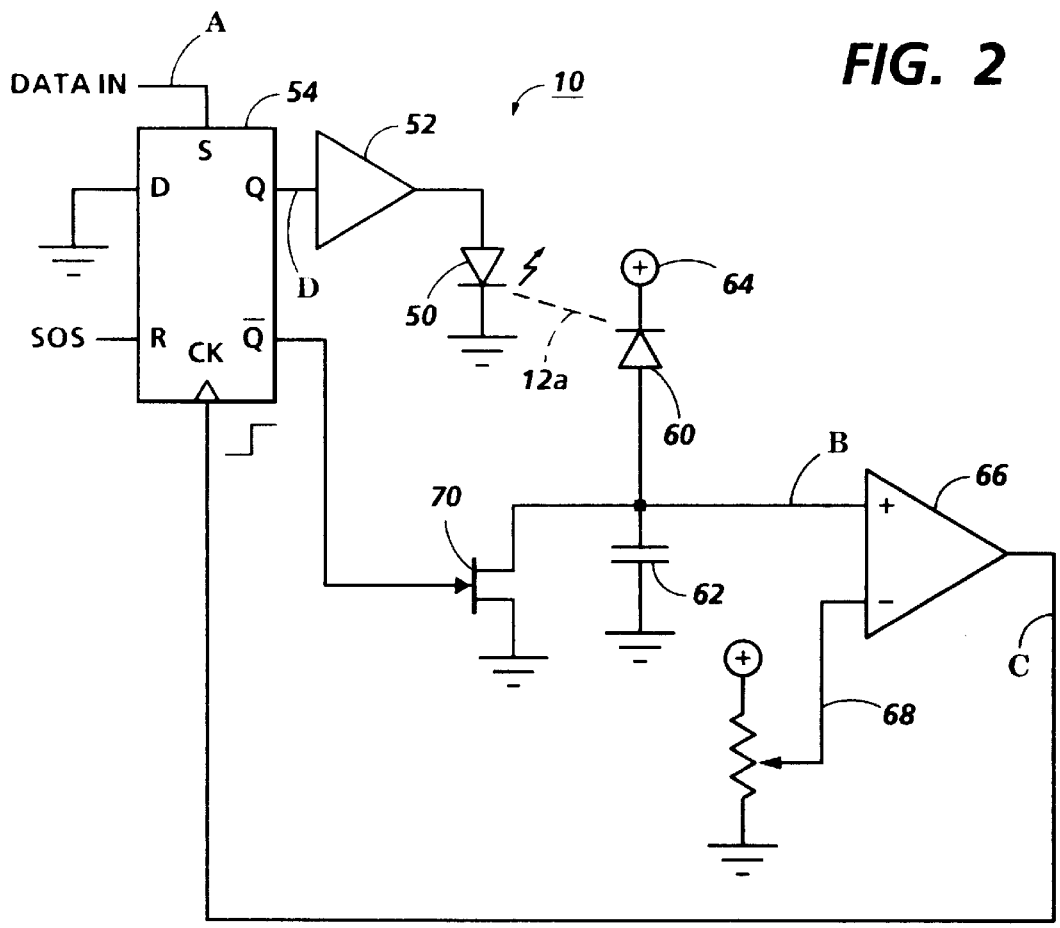
FIG. 2 is a schematic diagram of one embodiment of the reflex exposure control circuit according to the present invention.

FIG. 2 shows the basic elements of a laser control circuit according to the present invention. As shown in the schematic, a laser diode indicated as 50, which is intended to be provided within the laser source 10, is excited by means of current provided by laser driver 52 (which can be any one of several forms of modulating circuit as would be provided in a printing system) which is controlled by a high speed binary flip-flop indicated as 54. Coherent laser light flux originating in laser diode 50 is optically collimated to form writing beam 12. Preferably laser diode 50 is always operated at a level well above the highest lasing threshold current expected over the full range of permissible ambient conditions.

A sensor photodiode 60 is positioned to receive a fixed portion of the total light flux emitted by laser diode 50. As shown in FIG. 1, sensor diode 60 may be placed, for example, off-axis with respect to the collimation optics forming the main writing beam 12, in a position so that flux emitted from the front aperture of laser diode 50 toward the collimation optics (here indicated as off-axis beam 12a) may be detected by sensor photodiode 60. Alternately, another design option is to position sensor photodiode 60 with respect to the "back facet" of laser diode 50 to receive light flux emitted through the rear reflector of the laser diode cavity. What is important is that a fixed portion of the generated light flux be incident on sensor 60 so that the light output intensity of laser diode 50 can be monitored in real time.

It will be understood by those in the art that flux identified as off-axis beam 12a would not normally contribute to the writing beam 12 because it fails to pass through the collimation optics. Likewise, any light flux that "leaks" through the rear cavity reflector is incidental and typically plays no part in forming the writing beam 12. In both cases the strength of the writing beam 12 incident on the photoreceptor surface is therefore implied only indirectly. Although relative changes in the intensity of off-axis beam 12a and back facet light flux are equally useful in sensing short term relative changes in operating power level, the off-axis technique is superior to the back facet configuration because the radiation pattern from the front aperture of the laser diode is relatively invariant with respect to device aging and changes in apparent output due to aperture contamination. Directly sensing the output from the front aperture also reduces the calibration extremes needed to compensate for the wide range in front to back output ratios observed from batch to batch in laser diode devices. Perhaps even more important, a much higher power level is usually available making the detection circuitry much easier to implement with very fast response.

The portion of light flux originating in laser diode 50 and absorbed by the active volume of sensor photodiode 60 creates a photocurrent proportional to the intensity of the incident light with a typical conversion efficiency of 0.4 amps per watt. Associated with sensor diode 60 is a device for accumulating the charge passing through sensor photodiode 60, hereshown in the form of a capacitor 62 in the circuit of FIG. 2. The amount of charge accumulated on capacitor 62 is a direct measure of the intensity and duration of the light flux absorbed by sensor diode 60. Capacitor 62 thus serves to integrate the total charge passed by photodiode 60 over a given time period which is directly proportional to the total light flux received by the sensor diode 60 during that same period. In FIG. 2, photo-induced current flows through photodiode 60 from voltage source 64, building up a potential difference between the terminals of capacitor 62 from an initial uncharged state. The voltage at any given moment is given by the net accumulated charge in coulombs, divided by the capacitance value in farads.

Differential comparator 66 is configured to sense the voltage appearing on capacitor 62 with respect to a fixed reference voltage. The reference voltage is selected to yield optimal exposure from laser diode 50 in its intended ROS application. Factors that affect the value of the reference voltage include the throughput efficiency of the ROS optical system as a whole, the intrinsic sensitivity of the photoreceptor surface, the width and speed of the photoreceptor, as well as the ROS system resolution and the fraction of the laser output power incident on sensor photodiode 60. In a fixed optical configuration with all these factors constant, sensor diode 60, in combination with capacitor 62 and comparator 66, form an electronic analog of the photoreceptor spot 16 being exposed by the working beam 12. Photocurrent proportional to the intensity of the incident light is generated in both the active volume of the sensor photodiode and the photoreceptor layer, and in both cases the integrated photocurrent causes a net change in the voltage on a capacitive element, which, in the photoreceptor case, is the capacity of the photoreceptor layer itself. As a result of the direct correspondence between the level of discharge of the photoreceptor and the voltage accumulated on capacitor 62, it can be seen that the circuit of FIG. 2 responds to the actual exposing efficacy of laser diode 50 in a consistent way under a wide range of operating conditions. In the preferred embodiment of the present invention, precise regulation of photoreceptor exposure is provided by controlling the duration of the laser diode excitation for each and every pixel area which is desired to be exposed on the photoreceptor surface.

Figure 3:
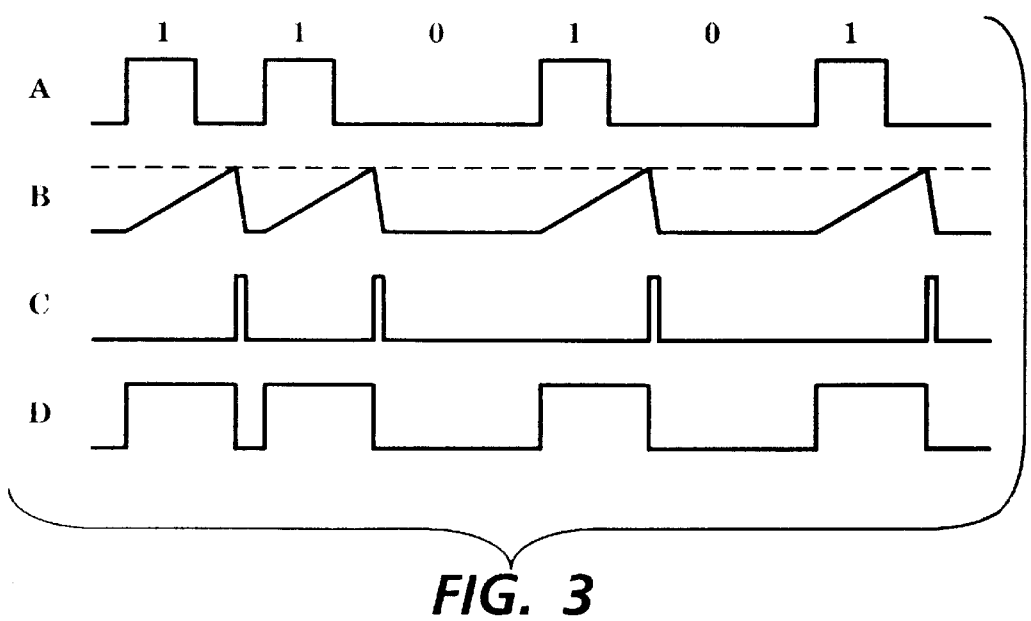
FIGS. 3A–3D are is a set of comparative waveforms relating to the operation of the circuit of FIG. 2.

FIGS. 3A–3D are timing diagrams showing voltage waveforms at four critical points in the circuit of FIG. 2 which illustrates the exposure of sequential pixels along a scan line according to an example serial data string 110101. The waveform in FIG. 3A is the logic voltage applied to the "set" input S of flip-flop 54 marked A in FIG. 2. The pattern of in FIG. 3A can be seen to correspond directly to the data pattern 110101. Positive logic transitions of waveform A set the Q output of flip-flop 54 to the "true" condition thereby activating laser diode 50 via laser driver 52. At the same time the emission of writing beam 12 by laser diode 50 illuminates the photoreceptor, photocurrent from sensor diode 60 is accumulated on capacitor 62 resulting in a voltage ramp shown as the waveform in FIG. 3B.

Each positive logic transition of waveform A initiates the turning on of laser diode 50. The rate at which the voltage ramps of FIG. 3B increase depends on the light flux intensity received by sensor diode 60. When the ramp voltage equals the reference voltage 68, the output of comparator 66, shown as FIG. 3C, makes a sharp positive transition indicating that the integrated light flux received by sensor diode 60 has reached its critical value. The waveform in FIG. 3C is applied to the clock input of flip-flop 54 in FIG. 2 so that each positive transition resets the flip flop Q output to its original standby state (Q equals "false") and shuts off laser diode 60 via deexcitation of laser driver 52. Note that the flip flop is reset at the clock transition which transfers the input (always "false") to the Q output, as shown in the waveform of FIG. 3D. The flip flop could just as well be directly reset through the R input but the configuration shown provides a convenient means of implementing an unconditional reset at the beginning of each scan line through the application of a Start of Scan (SOS) pulse at the R input.

Following the completion of pixel exposure and shut-off of laser diode 50, capacitor 62 is immediately reinitialized so that subsequent accumulation cycles start with capacitor 62 in the same uncharged state. Capacitor 62 is discharged by transistor 70 which shunts previously accumulated charge directly to ground. In FIG. 2, the gate of field effect transistor 70 is shown connected to the not-Q output of flip-flop 54, so that discharge of capacitor 62 takes place when drive amplifier 52 is inactive. Those skilled in the art will understand that, depending on its characteristics, transistor 70 may require additional circuitry, not shown, in order to bias the gate potential in the proper range for efficient conduction and cut-off. The discharge of capacitor 62 is shown in FIG. 3B as the steep downward-sloping portions of the waveform.

It is the intended function of the circuit in FIG. 2 to act as a "reflex" exposure control system for laser diode 50. Sensor diode 60 receives light directly from laser diode 50; the received light is directly indicative of the cumulative exposure of the photoreceptor induced by writing beam 12. When the sensor diode 60 has received the correct measure of light energy from laser diode 50 (i.e., consistent with the desired exposure level of photoreceptor 18 by writing beam 12), the system turns off, or quenches, laser diode 50. This "reflex" system obviates many real-time, real-world performance variations in a laser diode such as 50. If, under particular temperature and current conditions, the laser diode 50 power output is relatively weak, the system extends the duration of emission until the correct measure of light has been detected by sensor diode 60; alternatively, if under certain conditions the intensity of the beam from laser diode 50 is relatively high, shut-off is made to occur sooner.

The cycle of accumulating charge and quenching the emission of a writing beam from laser diode 50 is preferably repeated for each and every pixel exposure represented by the incoming digital data stream. As is known in the art of binary or on-off raster output scanners, each sequential bit being either a 1 (true) or 0 (false) in the input data stream corresponds to one pixel on the printed image; of course in this embodiment the exposure cycle need only come into play when the pixel is intended to be discharged by the laser, i.e., when a logical 1 (true) appears at the S input of flip flop 54 in FIG. 2 or 4. In the absence of logical 1=true input, the system can be considered to be in the standby or inactive mode. It is the function of the rotating polygon 14, noted above, to scan the writing beam 12 created by laser diode 50 to sequential pixel-sized spots in the raster image being created on the photoreceptor.

Figure 4:
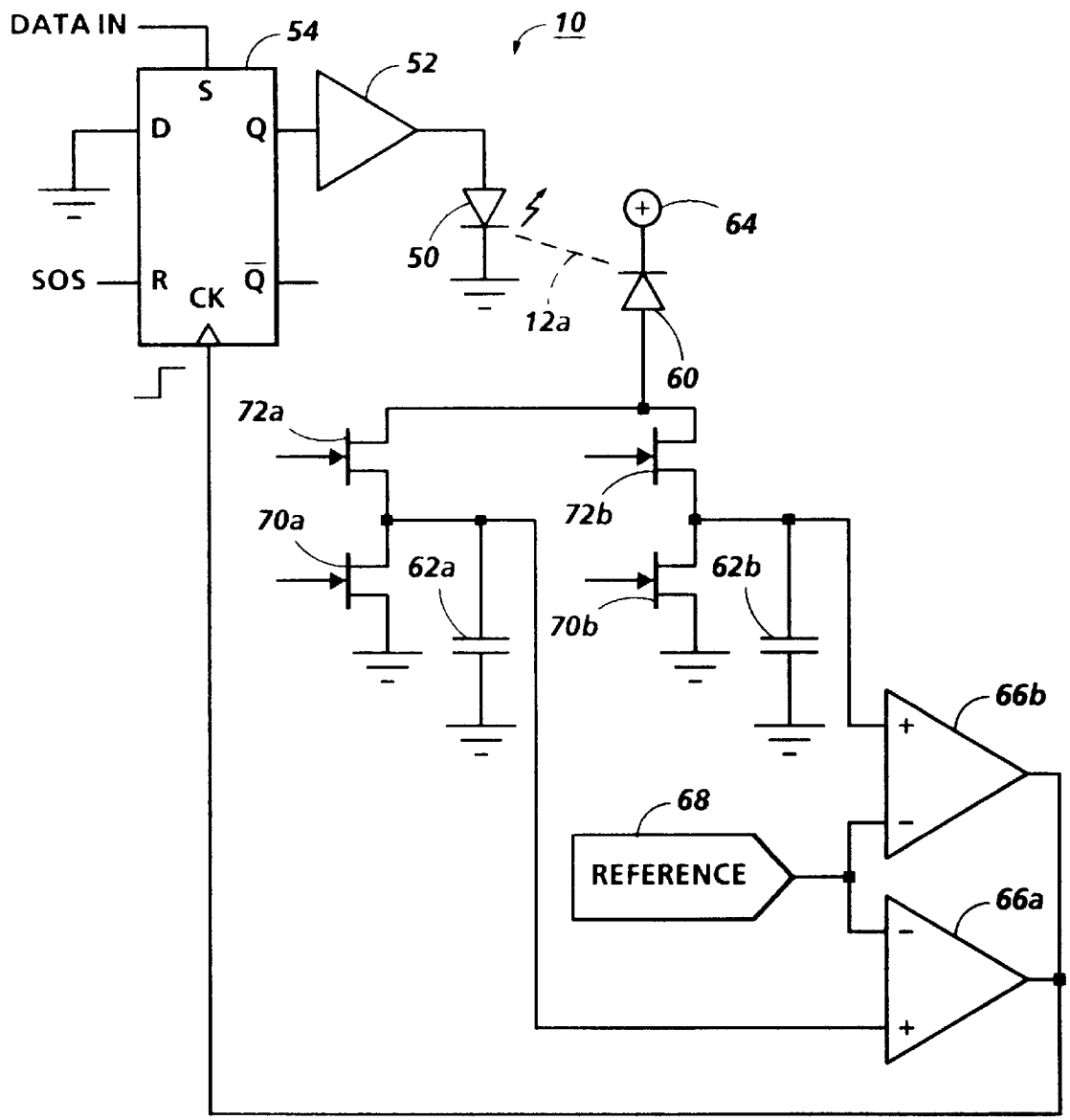
FIG. 4 is a schematic diagram of another embodiment of the reflex exposure control circuit according to the present invention.

At the higher processing speeds at which "laser" printing is practiced, one possible limitation is that the required very high bit stream rates make it difficult to properly reinitialize capacitor 62 to the fully discharged state between exposures. FIG. 4 is a schematic diagram of an alternate embodiment of a reflex exposure control circuit according to the present invention. In FIG. 4, like reference numerals indicate like elements as in FIGS. 3A–3D. There is further shown two separate capacitors 62a, 62b, connected to the inputs of two separate comparators 66a, 66b. Comparators 66a, 66b act as a comparator because they are windowed together. Each capacitor 62a, 62b is selectably controllable by a pair of current switches shown as transistors 72a, 72b in FIG. 4, and may be selectably discharged by means of field effect transistors 70a, 70b. It will be apparent that the timings of the activation of transistors 70 and 72 for each capacitor 62a or 62b can be controlled (such as by digital means, not shown) in a manner so that the respective capacitors 62a, 62b alternate in function, one capacitor such as 62a being used to accumulate charge from sensor photodiode 60 via current switch 72a while capacitor 62b is discharged by transistor 70b which shunts all previously accumulated charge directly to ground.

Figure 5A:
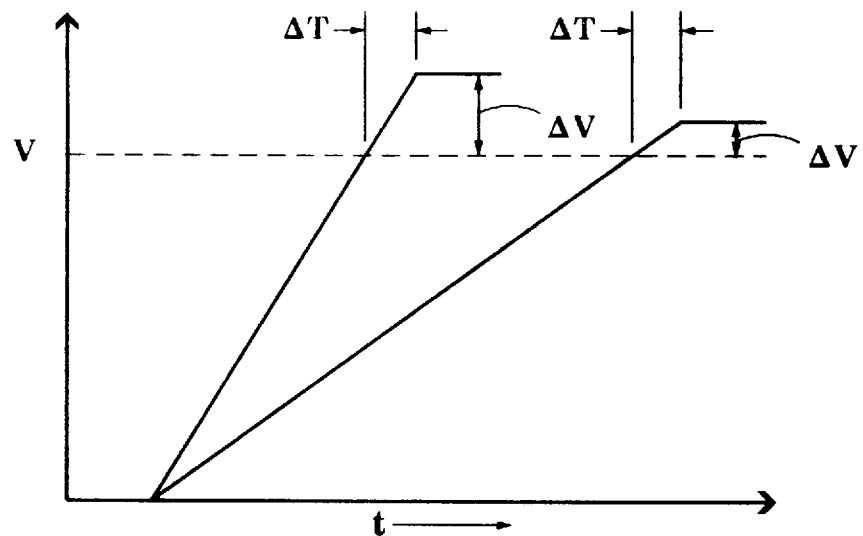
FIGS. 5A and 5B are comparative waveforms illustrating the principle of triggering delay exhibited by some embodiments of the present invention.
Figure 5B:
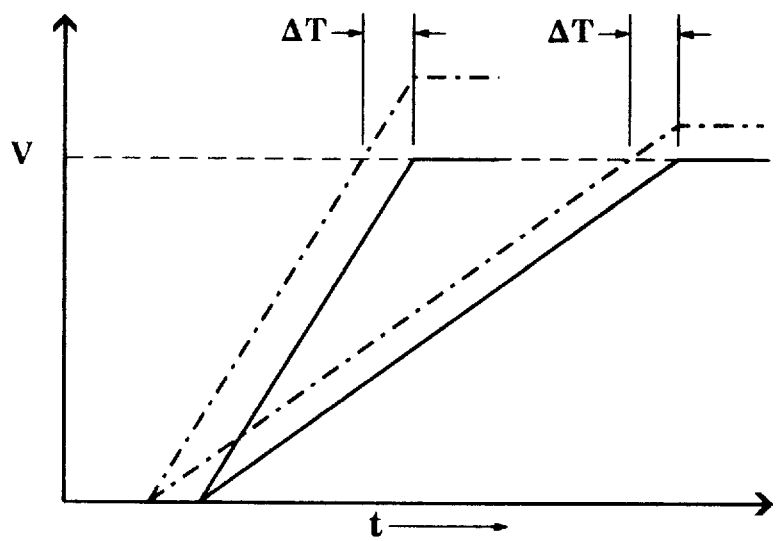

Another practical limitation with the basic system of the present invention is the non-linearity caused by a small but irreducible circuit delay between the accumulation of the critical charge on capacitor 62 and the actual shut down of laser diode 50. To a good approximation, the reaction times of comparator 66 and flip-flop 54 operating in series is constant. The non-linearity is introduced because laser diode 50 remains operational during the delay and adds to the charge accumulated on capacitor 62 at a rate depending on the power level of the laser diode source which is not constant. To illustrate, FIGS. 5A and 5B are comparative graphs showing the of FIG. 3 in greater detail. In both graphs, the x-axis is time and the y-axis is the voltage on capacitor 62 as a result of the accumulation of charge. In FIG. 5A, the two upward-sloping lines represent different rates of voltage rise on capacitor 62 in response to two different light levels incident on photodiode 60; the less steeply sloped line associated with a lower light level incident on sensor 60 takes proportionately longer to reach the threshold voltage. The difference in operating time between the initiation of the ramp and arrival at the threshold value V provides the basic regulating action of the circuits of FIG. 2 and FIG. 4. In both cases, however, the intrinsic delay, shown as $\Delta T$, in shutting off laser diode 50 in response to reaching the threshold causes the capacitor voltage to increase beyond V by an amount $\Delta V$ before the laser diode output is actually terminated. This $\Delta V$ represents excess flux sensed by photodiode 60, and, by implication, indicates an overexposure of the photoreceptor by a proportional amount.

It will be noted that in spite of the delays $\Delta T$ being equal, the magnitude of the voltage overshoot $\Delta V$ depends on the slope of the capacitor voltage and hence the mean operating power at the time the exposure was made. When laser diode 50 emits higher optical power output, $\Delta V$ and the corresponding exposure will be greater; if the power output of laser diode 50 is relatively weak, the value of $\Delta V$ will be relatively small, as shown by the sloped line at the right in FIG. 5B.

Figure 6:
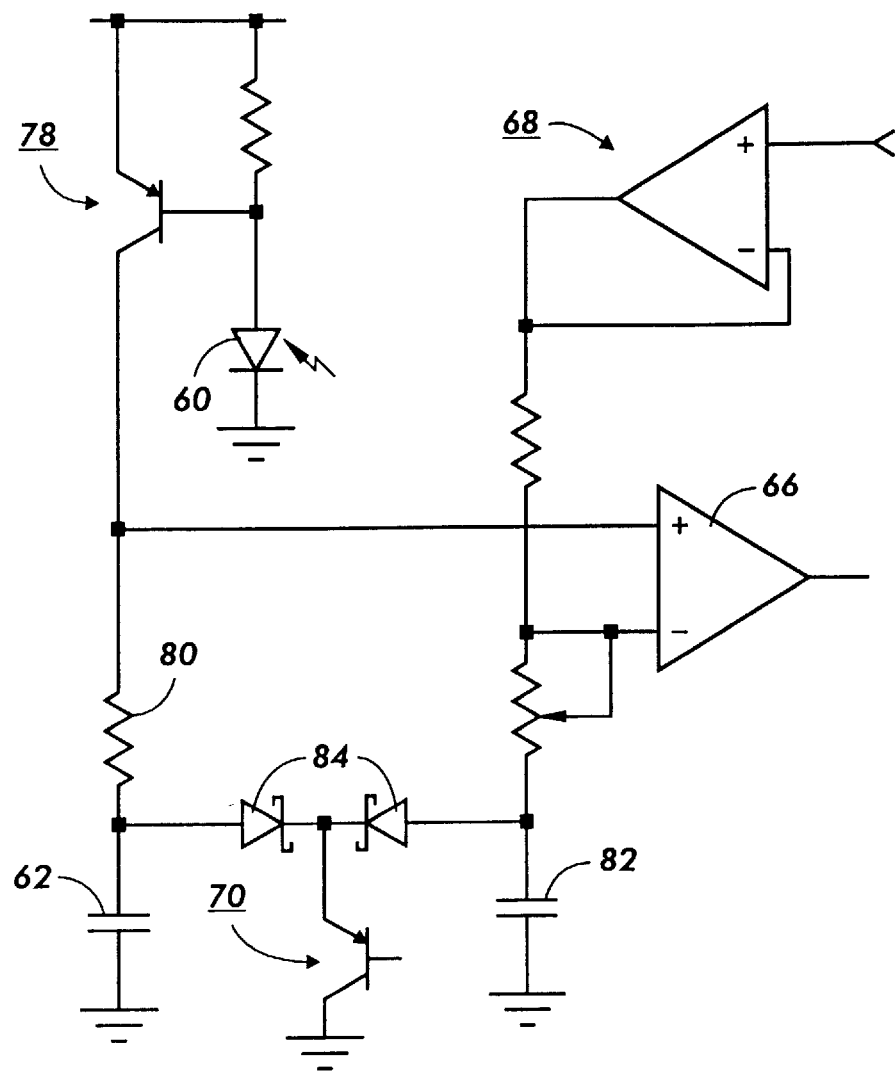
FIG. 6 is a schematic diagram of another embodiment of the reflex exposure control circuit according to the present invention.

According to another aspect of the present invention, the circuit time delay $\Delta T$ can be compensated, as illustrated in FIG. 6, by placing a fixed resistor 80 of value R in series with capacitor 62 such that the product of R times C is numerically equal to the nominal circuit delay $\Delta T$. Those familiar with the electronics art will recognize "RC" as the relaxation time constant appearing in the exponent $e^{-t/RC}$ describing the natural behavior of a series resistor capacitor network with time. By providing this additional series resistor 80 in the system, the potential sensed at the input of comparator 66 is offset from the voltage on capacitor 62 by an amount proportional to the current flowing into capacitor 62, as indicated by the broken lines in FIG. 5B. The voltage offset is given by IR=RC dv/dt where dv/dt is the slope of the voltage ramp and can be seen to cause comparator 66 to respond early by a fixed amount which is independent of the slope. Thus by selecting the value of resistor 80 to satisfy the relationship RC=$\Delta T$, the voltage offset can be made to compensate exactly for the time delays in the circuit response of comparator 66 and flip-flop 54. By effectively advancing the time at which the critical voltage at the input of comparator 66 is reached by an amount equal to the circuit time delay $\Delta T$, the laser is shut off at exactly the point at which the charge on the capacitor 62 reaches the reference value. Since $\Delta V$ is a measure of excess flux sensed by photodiode 60, variations in exposure at the photoreceptor due to differences in laser diode efficacy are eliminated.

It is to be noted that an average overshoot $\Delta V$ can be compensated by simply recalibrating the threshold reference voltage. However, very high quality imaging requires very close control on photoreceptor exposure and even small variations in $\Delta V$ can be problematic. Variations in the junction temperature in a laser diode typically causes a wide swing in optical output intensity at constant operating current. At the same time, printed images usually contain patterns that require exposure over a constantly changing duty cycle which results in uneven power dissipation in the junction. As a result, the light intensity available for exposing one pixel depends on the exposure pattern of previously exposed pixels. This effect is similar to a related mechanism called "droop" in which junction heating causes the intensity of the laser beam to fade within the length of a single pixel. By correcting for integrated exposure on a pixel-by-pixel basis, the present invention corrects for these unwanted effects and others that change the laser output intensity, and compensates for manufacturing differences between individual laser diode devices as well.

FIG. 6 is a schematic diagram of another embodiment of the present invention suitable for high-speed applications where like reference numerals represent like elements as in FIGS. 3A–3D. In addition to the elements shown in previous embodiments, there is also provided an external amplifier 78 for amplifying the output of sensor photodiode 60, and reference voltage source 68 may include an adjustment means, as shown. In FIG. 6, resistor 80 provides the desirable voltage offset associated with capacitor 62 which has been selected for the desired RC value by measuring the time delay $\Delta T$ of the comparator and flip flop (not shown) in actual operation. There is also provided, associated with reference voltage source 68, a relatively large capacitor 82 and resistor 88 which, in combination with Schottky diodes 84 and a PNP discharge transistor in the emitter follower configuration, provides a system in which both inputs of comparator 66 are referenced to a common discharge level, by which common mode errors are minimized.

While the invention has been described with reference to the structure disclosed, it is not confined to the details set forth, but is intended to cover such modifications or changes as may come within the scope of the following claims.

We claim:

1. In an electrophotographic printing apparatus for directing a modulated writing beam to a photosensitive surface to selectably expose a plurality of pixel areas thereon, the apparatus including a laser diode outputting the writing beam, an apparatus for controlling the laser diode, comprising:

a sensor diode positioned to receive a portion of light flux directly from the laser diode while the laser diode emits the writing beam to expose one pixel area on the photosensitive surface;

a first accumulator, accumulating charge created by the sensor diode resulting from said portion of light flux from the laser diode;

a second accumulator, accumulating charge created by the sensor diode resulting from said portion of light flux from the laser diode;

a comparator connected to the first accumulator and the second accumulator, monitoring charge accumulated on one of the first and the second accumulator and outputting a quench signal if said charge accumulated on the first accumulator or the second accumulator exceeds a predetermined threshold level, the quench signal operating to turn off the laser diode; and at least one-switch connecting one of the first accumulator and the second accumulator to the sensor diode and simultaneously discharging another one of the first accumulator and the second accumulator.

2. The apparatus of claim 1, wherein the predetermined threshold level is related to a desired exposure level for a pixel area on the photosensitive surface.

3. The apparatus of claim 1, wherein the comparator is operable for each and every pixel area to be exposed to create a desired image on the photosensitive surface.

4. In an electrophotographic printing apparatus for directing a modulated writing beam to a photosensitive surface to selectably expose a plurality of pixel areas thereon, the apparatus including a laser diode outputting the writing beam, an apparatus for controlling the laser diode, comprising:

a sensor diode positioned to receive a portion of light flux directly from the laser diode while the laser diode emits the writing beam to expose one pixel area on the photosensitive surface;

an accumulator accumulating charge created by the sensor diode resulting from the portion of light flux from the laser diode, the accumulator including a capacitor accumulating charge created by the sensor diode resulting from light flux from the laser diode, and a predetermined resistance connected to the capacitor, the resistance and capacitor forming an RC circuit having a predetermined time constant associated therewith; and a comparator connected to the accumulator, monitoring charge accumulated on the accumulator and outputting a quench signal said charge accumulated on the accumulator exceeds a predetermined threshold level, the quench signal operating to turn off the laser diode.

5. The control apparatus of claim 4, wherein the time constant is of a duration suitable to cause the comparator to output the quench signal in advance of the charge accumulated on the accumulator exceeding said predetermined threshold level.

6. The control apparatus of claim 4, further comprising a reference exposure control voltage source, for inputting into the comparator a voltage relating to the predetermined threshold level for the charge accumulated on the accumulator.

7. The control apparatus of claim 6, further comprising an RC circuit associate with the reference exposure control voltage source.

8. The apparatus of claim 4, wherein the predetermined threshold level is related to a desired exposure level for a pixel area on the photosensitive surface.

9. The apparatus of claim 4, wherein the comparator is operable for each and every pixel area to be exposed to create a desired image on the photosensitive surface.

* * * * *